(12) United States Patent
Hoover

(10) Patent No.: US 6,561,310 B2
(45) Date of Patent: May 13, 2003

(54) METHOD AND APPARATUS FOR MEASURING SEISMIC ENERGY IMPARTED TO THE EARTH

(75) Inventor: Gary M. Hoover, Bartlesville, OK (US)

(73) Assignee: Conocophillips Company, Houston, TX (US)

( * ) Notice: Subject to any disclaimer, the term of this patent is extended or adjusted under 35 U.S.C. 154(b) by 206 days.

(21) Appl. No.: 09/801,214

(22) Filed: Mar. 7, 2001

(65) Prior Publication Data

US 2002/0149998 A1 Oct. 17, 2002

(51) Int. Cl.[7] .................................................. G01V 1/04
(52) U.S. Cl. ....................... 181/121; 181/122; 181/106; 181/108; 181/113; 181/114
(58) Field of Search ................................. 181/121, 122, 181/106, 108, 113, 114

(56) References Cited

U.S. PATENT DOCUMENTS

| 4,965,774 A | 10/1990 | Ng et al. ....................... 367/75 |
| 5,026,141 A | 6/1991 | Griffiths ....................... 385/13 |
| 5,400,299 A | 3/1995 | Trantham ....................... 367/38 |
| 5,790,473 A | 8/1998 | Allen ........................... 367/57 |
| 5,901,112 A | 5/1999 | Walker ......................... 367/46 |

FOREIGN PATENT DOCUMENTS

GB          2347744      *   9/2000

* cited by examiner

*Primary Examiner*—Shih-Yung Hsieh
(74) *Attorney, Agent, or Firm*—Kameron D. Kelly

(57) ABSTRACT

A non-contact vibrometer is employed to measure seismic energy imparted to the earth by a land vibrator. The non-contact vibrometer can be a laser vibrometer operable to measure the motion of a baseplate of the land vibrator. A computing device can be used to record both the imparted seismic energy detected by the non-contact vibrometer and reflected seismic energy sensed with geophones.

14 Claims, 5 Drawing Sheets

METHOD AND APPARATUS FOR MEASURING SEISMIC ENERGY IMPARTED TO THE EARTH

BACKGROUND OF THE INVENTION

The present invention relates generally to the field of seismic exploration. In one aspect, this invention relates to an apparatus for measuring the actual seismic energy imparted to the earth by a vibrating baseplate. In another aspect, this invention relates to a method for measuring the actual seismic energy imparted to the earth by a vibrating baseplate.

Seismic exploration for subterranean hydrocarbon deposits is common practice in the oil and gas industry. Reflection surveys are the most common type of seismic surveys in practice today. In reflection-type seismic surveys, seismic waves are induced into the earth and reflected back to the surface by subsurface strata. At the surface, the reflected seismic waves are detected by a group of spaced apart receivers called geophones. The geophones produce seismic reflection signals which can be processed to form images of the subsurface. The energy source used to induce the seismic waves in the earth can be impulsive or vibrational. Impulsive seismic sources, such as dynamite, impart a brief, but powerful seismic wave into the earth. In many locations, however, the use of impulsive seismic sources is impractical due to safety and environmental concerns. As a result, vibrational energy sources have become the preferred means for imparting seismic waves in the earth.

The most common vibrational seismic exploration system used today is known commercially as a VIBROSEIS® system. This type of system typically uses a quasi-sinusoidal reference signal, or so-called pilot signal, of continuously varying frequency, selected band width, and selected duration to control the injection of seismic waves into the earth. The pilot signal is converted into a mechanical vibration in a land vibrator having a baseplate which is coupled to the earth. The land vibrator is typically mounted on a carrier vehicle which provides locomotion. During operation, the baseplate is contacted with the earth's surface and the weight of the carrier vehicle is applied to the baseplate. A servo-hydraulic piston connected to the baseplate is then excited by the pilot signal, causing vibration of the baseplate against the earth.

Vibrational seismic sources, such as those employed in the VIBROSEIS® system, are typically much less powerful than impulsive seismic energy sources, such as dynamite. Thus, in order for vibrational seismic sources to impart a signal of sufficient energy for accurate measurement, the duration of the vibrational signal must be longer (i.e., 2 to 20 seconds) than the duration of an impulsive signal (i.e., a few milliseconds). To assure good resolution, the relatively long reflected seismic signal received by the geophones is compressed to a short pulse, similar to that which would be produced by an impulsive seismic system. This principal of "pulse compression" is well known in the art and is generally achieved by cross-correlating the received seismic signal against the pilot signal used to drive the vibrator.

A variety of correlation techniques are well known in the art. For example, various correlation techniques are well described by N. A. Anstey "Correlation Techniques—A Review", Geophysical Prospecting, Vol. XII, No. 4, 1964. In simplified terms, correlation techniques identify the presence of a seismic reflection in the time domain based on the sum obtained by solving the well known cross-correlation equation:

$$\phi_{gr}(\tau) = \frac{1}{T}\int_0^T r(t)g(t-\tau)dt$$

where $g(t-\tau)$ is the input pilot signal delayed by an amount $(\tau)$ and where $r(t)$ is the measured reflection signal. In effect, the pilot signal is "overlain" onto the reflection signal at incremental delay times $\tau$. At each delay time the integrated area under the signal-pilot product curve is the "pulse compressed" signal. The delay time equals the travel time of the reflected signal. Assuming that the wave velocities in the subsurface strata are known, the depth of the associated reflecting subsurface strata interface can be determined.

Recently, new methods of pulse compression have been developed which employ inversion rather than correlation to compress the reflected seismic signals. Examples of such inversion techniques are well described in Walker, U.S. Pat. No. 5,901,112 and Allen, U.S. Pat. No. 5,790,473.

A significant problem with conventional systems employing a vibrating baseplate to impart seismic waves into the earth is that the actual motion of the baseplate, and thus the actual seismic energy imparted to the earth, is different from the ideal motion represented by the pilot signal. This difference can be caused by a variety of factors, including (1) harmonics of the baseplate, (2) decoupling of the baseplate from the earth's surface, (3) nonlinearities in the mechanical hydraulic system, (4) flexure of the baseplate, and (5) flexure of the frame supporting the land vibrator. The differences between the pilot signal and the actual baseplate motion are problematic because, in the past, the pilot signal was used to pulse-compress the reflected seismic signal either through correlation or inversion. Thus, if the actual motion of the baseplate was different from the ideal motion corresponding to the pilot signal, the pulse-compressed reflected seismic signal produced by correlation or inversion was inaccurate.

Various methods of obtaining a signal representative of the actual seismic energy imparted to the earth have been attempted in the past. Most of the past methods employ one or more accelerometers attached to a surface of the baseplate for providing a signal representative of the acceleration of the baseplate. This signal was then processed to obtain a signal simulating actual baseplate motion.

The use of accelerometers for measuring baseplate motion has a number of drawbacks. The primary drawback is the near impossibility of creating an accelerometer which is durable enough to withstand the conditions of the baseplate, yet sensitive enough to effectively read the vibrations of the baseplate. Typically, the most sensitive accelerometers wear out quickly when exposed to the conditions of the vibrating baseplate.

In addition, accelerometers attached to the surface of the baseplate can be physically damaged by the external environment when the seismic survey is performed on rough terrain.

SUMMARY OF THE INVENTION

It is an object of the present invention to provide a system for accurately measuring seismic energy imparted to the earth by a vibrating baseplate.

It is another object of the present invention to provide a system for more accurately, compressing a received seismic signal.

It is a further object of this invention to provide a system for effectively utilizing measurements of baseplate harmonics in generating a pulse-compressed measured seismic signal.

In accordance with the embodiment of the present invention, there is provided an apparatus for performing seismic surveys. The apparatus includes a land vibrator operable to induce seismic waves into the earth. The apparatus also includes a non-contact vibrometer for measuring the induced seismic waves.

In another embodiment of this invention, a method for conducting a seismic survey is provided. The method includes the step of vibrating a baseplate coupled to the earth to thereby induce seismic waves in the earth. The method further includes the step of measuring the induced seismic waves using a non-contact vibrometer.

The method and apparatus of this invention provide a more accurate and durable system for measuring the actual seismic energy imparted to the earth. Thus, the present invention produces more detailed and reliable seismic surveys.

Additional objects and advantages of this invention will be apparent in the description which follows and in the appended claims and drawings.

BRIEF DESCRIPTION OF THE DRAWING FIGURES

Preferred embodiments of the invention are described in detail below with reference to the attached drawing figures, wherein.

DETAILED DESCRIPTION OF THE PREFERRED EMBODIMENTS

Figure 1:
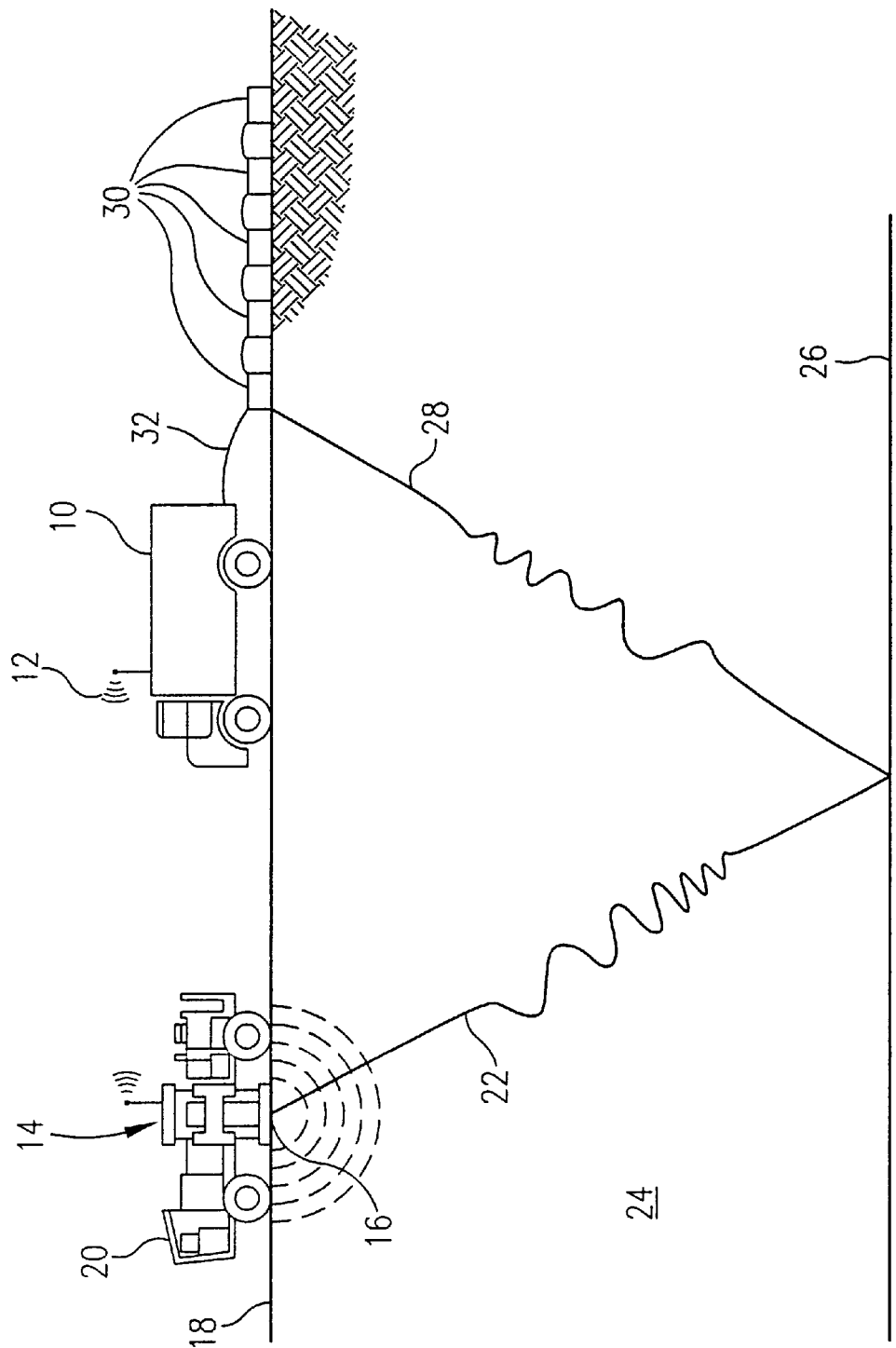
FIG. 1 is a side view of a seismic exploration system.

FIG. 1 illustrates a vibrational seismic survey system. A pilot signal is generated in recorder/processor truck 10 and sent by radio wave link 12 to a land vibrator 14. Land vibrator 14 converts the pilot signal into mechanical motion which vibrates a baseplate 16. Baseplate 16 contacts a surface 18 of the earth and is coupled to surface 18 by the weight of a carrier vehicle 20. Baseplate 16 imparts an induced seismic wave 22 into a subsurface 24 of the earth. Induced seismic wave 22 travels downward through subsurface 24 and is altered (i.e., refracted or reflected) by a subsurface strata 26. An altered seismic wave 28 travels from subsurface strata 26 upward through subsurface 24 to surface 18. Geophones 30, located on surface 18, are generally spaced apart from each other and from land vibrator 14. Geophones 30 measure altered seismic wave 28 at surface 18 and transmit an altered seismic signal indicating altered seismic wave 28 across geophone lines 32 to recorder/processor truck 10. As further described below, a baseplate signal is transmitted from land vibrator 14 via radio wave link 12 to recorder/processor truck 10 for processing.

Figure 2:
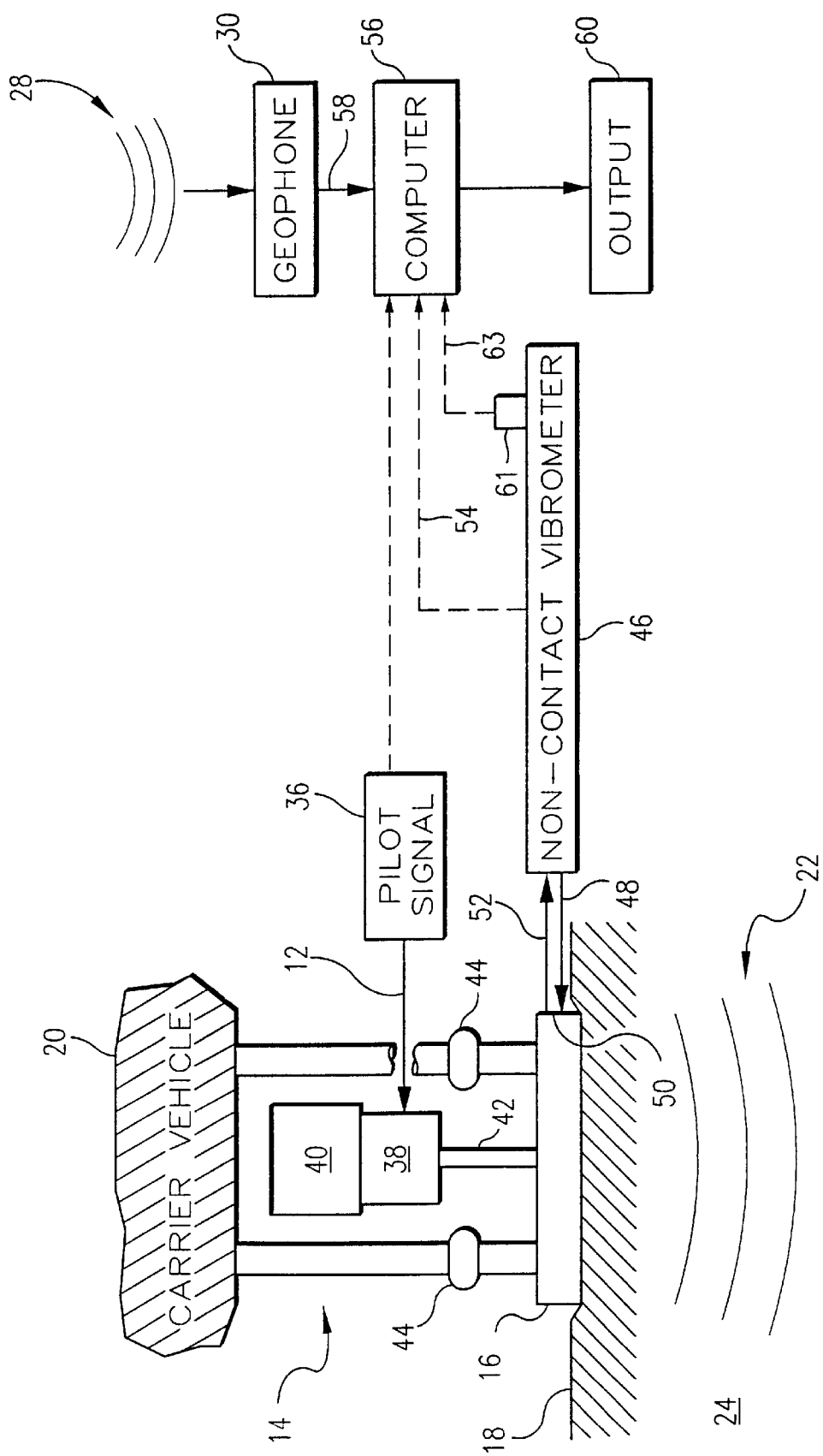
FIG. 2 is a side view of a seismic land vibrator and a block diagram showing the operational interaction between the seismic land vibrator and various components of a seismic exploration system.

Referring now to FIG. 2, a pilot signal 36 is generated and sent to land vibrator 14 via radio wave link 12. Pilot signal 36 is typically a quasi-sinusoidal electrical signal of continuously varying frequency, but can also be a time signal with a variety of forms. The frequency of pilot signal 36 may vary from a starting frequency of from about 5 hertz to about 15 hertz to an ending frequency of from about 40 hertz to about 120 hertz. The duration of pilot signal 36 may be from about 0.5 seconds to about 30 seconds, preferably from 2 seconds to 10 seconds.

Pilot signal 36 travels across radio link 12 and is received by a vibration generator 38. Vibration generator 38 is preferably a servo-hydraulic device operable to generate mechanical motion which substantially corresponds to pilot signal 36. Vibration generator 38 is coupled to a reaction mass 40 and baseplate 16. The oscillating mechanical motion created by vibration generator 38 is resisted by the weight of reaction mass 40, thereby exerting an oscillating, substantially downward force on baseplate 16 via a piston 42.

Baseplate 16 is typically a rectangular plate made of a suitable material such as, for example, steel. The weight of carrier vehicle 20 is applied to baseplate 16 in order to keep baseplate 16 substantially coupled to surface 18 during operation. Carrier vibration isolators 44, such as air bags or springs, are interposed between carrier vehicle 20 and baseplate 16 to dampen the vibration imparted to carrier vehicle 20 by baseplate 16. Preferably, carrier vibration isolators 44 substantially isolate carrier vehicle 20 from the vibrations of baseplate 16. The substantially static downward force exerted on baseplate 16 by carrier vehicle 20 and the dynamic downward force exerted on baseplate 16 by piston 42 combined to impart induced seismic waves 22 into subsurface 24.

A non-contact vibrometer 46 is employed to measure induced seismic waves 22. Non-contact vibrometer 46 measures the induced seismic waves 22 by emitting an emitted signal 48 which is directed towards a measured location 50 on an exposed surface of baseplate 16 or surface 18. Non-contact vibrometer 46 then reads a returned signal 52 from measured location 50. Returned signal 52 can then be compared to emitted signal 48 to determine the motion of baseplate 16 or surface 18 at measurement location 50.

Non-contact vibrometer 46 is preferably sensitive enough to measure not only the ideal motion of baseplate 16 which corresponds to pilot signal 36, but also other less detectable motions cause by, for example, harmonics of baseplate 16 and nonlinearities due to flexures in components of land vibrator 14. Measuring these fine motions which are undetectable by conventional measurement means allows for more accurate determinations of subsurface formations.

Non-contact vibrometer 46 is preferably a laser vibrometer, with emitted signal 48 being a laser beam, and returned signal 52 being a doppler-shifted laser signal. Non-contact vibrometer 46 is preferably capable of measuring multi-directional motion in directions parallel and perpendicular to emitted signal 48. Further, non-contact vibrometer is preferably capable of accurate velocity measurements from about 1 millimeter per second to about 500 millimeters per second. Preferably, non-contact vibrometer 46 is capable of accurate frequency measurements from about 1 hertz to about 100 kilohertz. Preferably, non-contact vibrometer 46 is capable of taking accurate measurements at distances from about 0.1 meters to about 25 meters. Suitable laser vibrometers include, for example, the Polytec PSV-300, available from Polytec PI, Inc., Tustin, Calif.

As shown in FIG. 2, non-contact vibrometer 46 generates a measured motion signal 54 indicating the motion of measured location 50 relative to non-contact vibrometer 46. A computing device 56 receives, as input, measured motion signal 54, pilot signal 36 and a received seismic signal 58. Received seismic signal 58 is generated by geophones 30 and corresponds to altered seismic waves 28 at surface 18. Computing device 56 can perform a variety of filtering, convolution, de-convolution, correlation and/or inversion functions to yield a pulse-compressed output 60 from which subterranean formations can be analyzed.

In one embodiment of the present invention, an accelerometer 61 can be attached to non-contact vibrometer 46 to measure the motion of non-contact vibrometer 46. A vibrometer motion signal 63 generated by accelerometer 61 can then be sent to computing device 56 where it is filtered from measured motion signal 54 to obtain a corrected measured motion signal. Thus, even if non-contact vibrometer 46 is not substantially vibrationally isolated from baseplate 16, an accurate measurement of the motion of measured location 50 can still be obtained by filtering.

Figure 3:
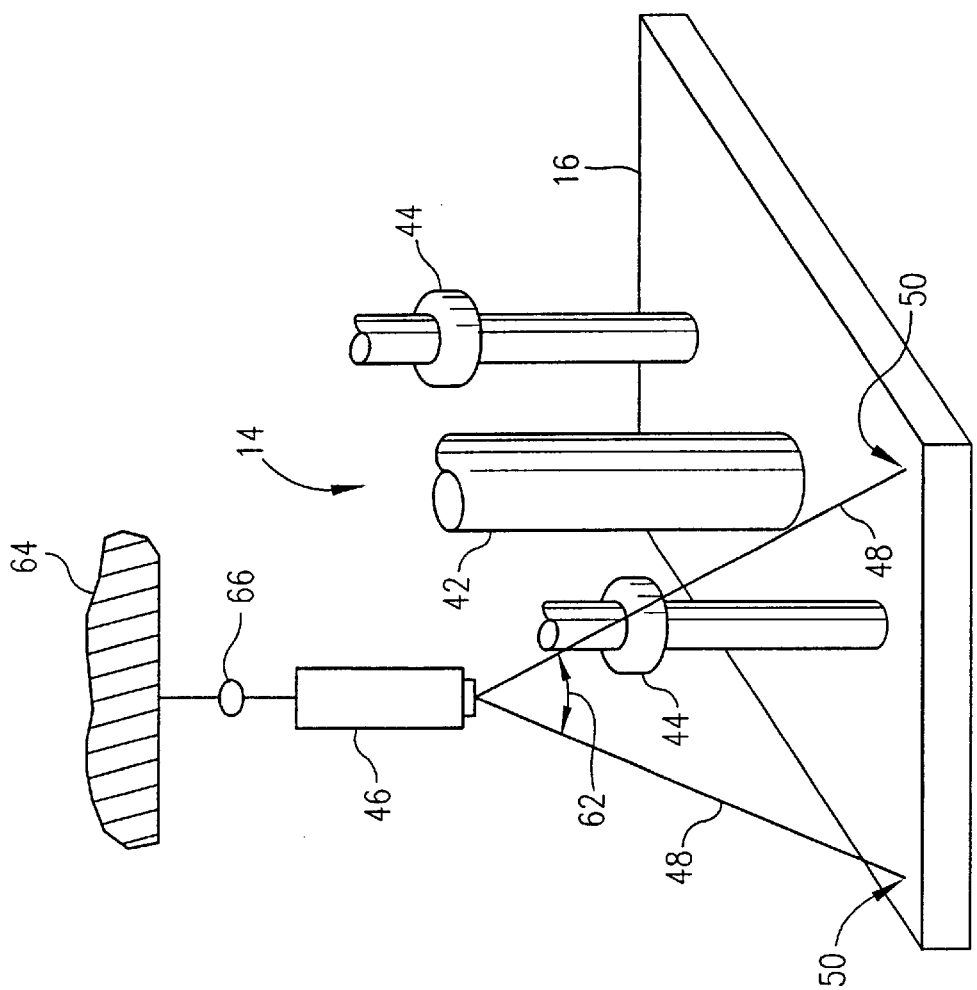
FIG. 3 is a perspective view showing the position of the non-contact vibrometer relative to the baseplate.
Figure 4:
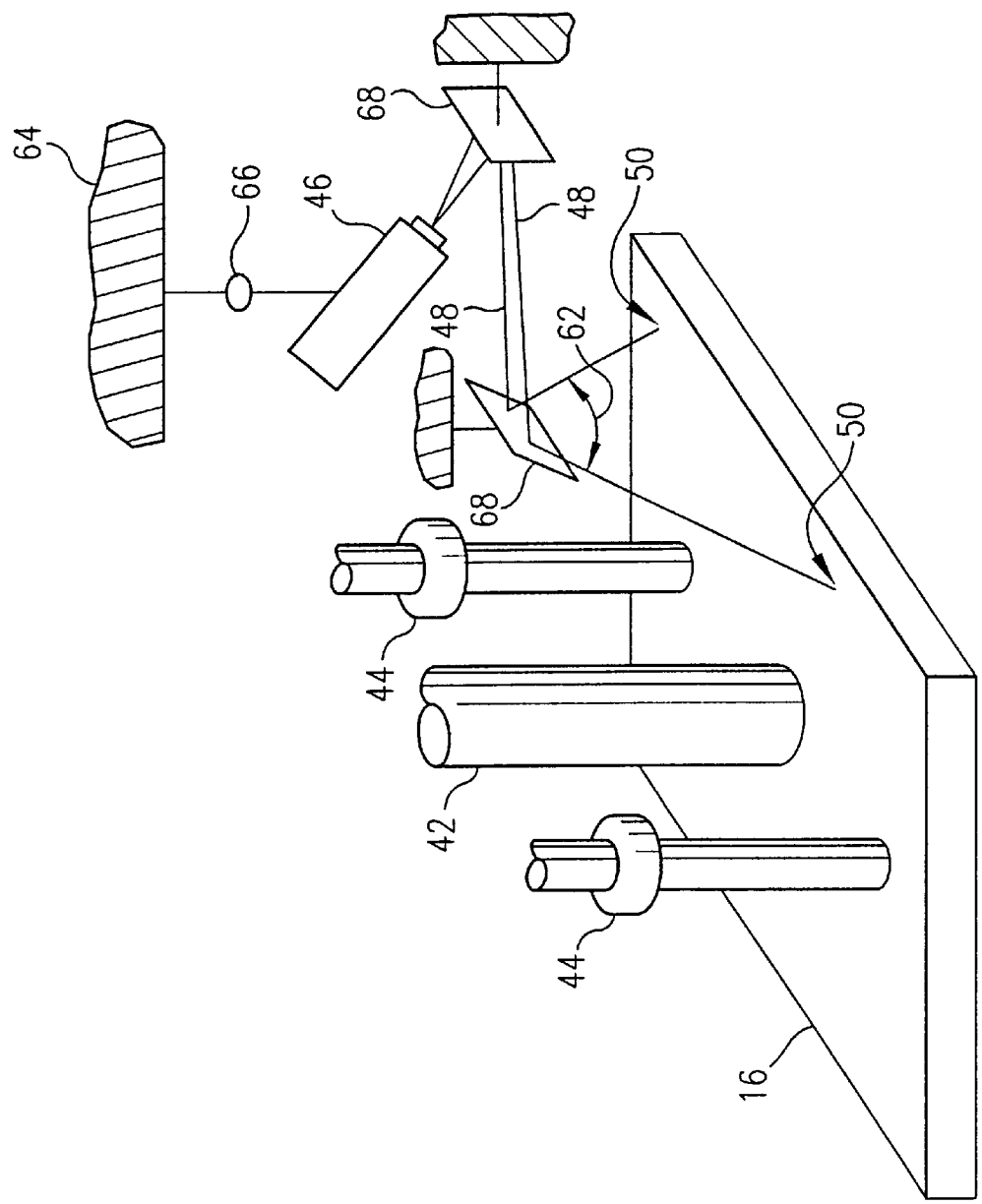
FIG. 4 is a perspective view showing an alternative position of the non-contact vibrometer relative to the baseplate.

Referring now to FIGS. 3 and 4, non-contact vibrometer 46 is preferably a scanning vibrometer capable of measuring a plurality of measured locations 50 by scanning emitted signal 48 over an exposed surface of baseplate 16 according to a scan angle 62. Alternatively, measured location 50 can be on the earth's surface proximate baseplate 16. Although FIGS. 3 and 4 illustrate only a single non-contact vibrometer 46, it may be advantageous to employ multiple vibrometers to obtain multiple motion measurements at a variety of measured locations 50.

Non-contact vibrometer 46 is supported by a support member 64. A vibrometer vibration isolator 66 is disposed between support member 64 and non-contact vibrometer 46 to a least partially, preferably substantially, vibrationally isolate non-contact vibrometer 46 from the vibrations of baseplate 16 and the carrier vehicle. Support member 64 can be a carrier vehicle or a land vibrator. Alternatively, support member 64 can be a device, such as, for example, a tripod, for supporting non-contact vibrometer 46 on the earth's surface.

As best seen in FIG. 4, one or more mirrors 68 can be employed to direct emitted signal 48 to various measurement locations 50. Mirrors 68 are especially useful when non-contact vibrometer 46 cannot be positioned to provide a direct line of sight to desired measured locations 50.

In an alternative embodiment, not shown, the non-contact vibrometer can be positioned to measure the actual motion of the earth's surface, rather than that of the baseplate, at a location or locations proximate to the baseplate. This configuration would ensure accurate measurement of the actual seismic energy imparted to the surface of the earth.

Figure 5:
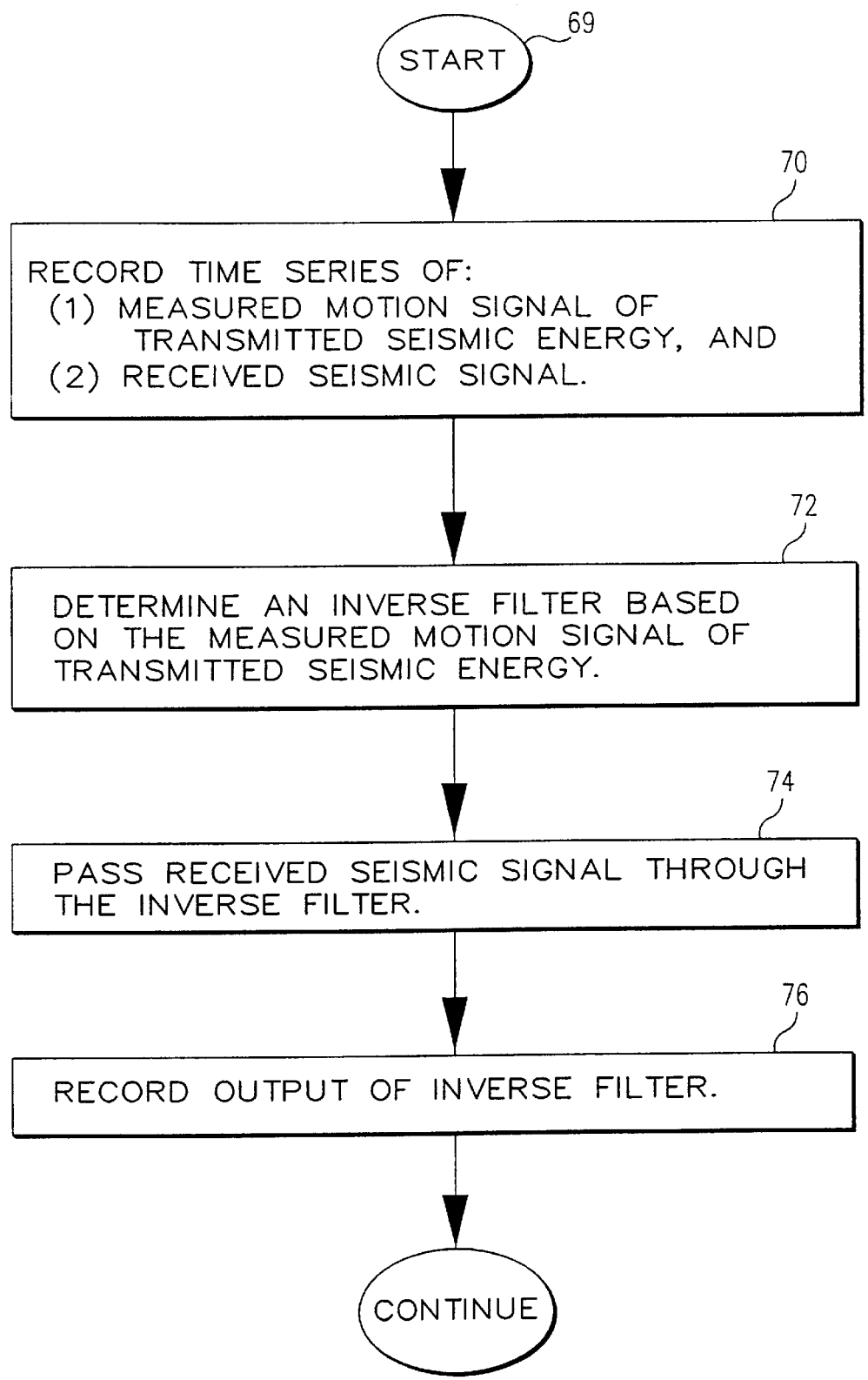
FIG. 5 is a computer software flowchart illustrating a method performed by the apparatus of FIG. 2.

Now referring to FIG. 5, there is illustrated a simplified software flow diagram for pulse compression of seismic signals using measured motion signal 54 indicating actual baseplate motion or earth motion proximate to the baseplate. The software represented in FIG. 5 is preferably implemented by computing device 56, shown in FIG. 2. Referring now to FIGS. 2 and 5, computing device 56 is rendered operative at a start step 69 when land vibrator 14 is activated. In the preferred embodiment, computing device 56 is programed at a step 70 to record measured motion signal 54 and received seismic signal 58. Next, computing device 56 proceeds to a filter-determination step 72 where an inverse filter matched to the measured motion signal 54 provided by non-contact vibrometer 46 is determined. The inverse filter preferably has a pass-band that includes harmonics associated with the seismic energy generation. After the inverse filter is determined in step 72, the previously recorded received seismic signal 58 is cross-correlated with the inverse filter, or equivalently the received seismic signal 58 is passed through the inverse filter in step 74 to yield a pulse-compressed seismic signal. In an output step 76, the pulse-compressed output of the inverse filter is recorded for use in constructing a cross section of subsurface 24.

In one embodiment of the invention, not shown in FIG. 5, computing device 56 is further programmed at step 70 to record a vibrometer motion signal 63 indicating the actual motion of non-contact vibrometer 46. Between step 70 and step 72, computing device 56 filters vibrometer motion signal 63 from measured motion signal 54 to thereby obtain a corrected measured signal. The corrected measured signal, rather than uncorrected motion signal 54, can then be processed by computing device 56 in steps 72, 74, and 76 to produce pulse-compressed output useful for constructing a cross section of subsurface 24.

Actual design criteria and computational procedures needed to obtain the filters for seismic analysis are well described by E. A. Robinson, et al. "Principles of Digital Wiener Filtering", Geophysical Prospecting, Vol. XV, No. 3, September, 1967, incorporated herein by reference. Further, the use of inverse filters for pulse compression is described in Walker, U.S. Pat. No. 5,901,112, incorporated herein by reference.

While this invention has been described in terms of its presently preferred embodiment, it is to be understood that the invention may find application in various other environments. For example, the present invention is described primarily with reference to reflection-type seismic surveys, however, the present invention is equally effective for refractive-type seismic surveys. Accordingly, reasonable modifications and variations of the invention, which are possible of those skilled in the art, are also considered to be within scope of the foregoing description and the pending claims.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. An apparatus for performing seismic surveys, said apparatus comprising:
   a land vibrator for imparting induced seismic waves into the earth; and
   a non-contact vibrometer for measuring said induced seismic waves, wherein said non-contact vibrometer emits a laser beam, wherein said land vibrator has a vibratable baseplate for contacting the earth, and wherein said non-contact vibrometer is positioned to direct said laser beam to a measured location on an exposed surface of said baseplate.

2. An apparatus according to claim 1, wherein said non-contact vibrometer is a scanning laser vibrometer capable of measuring a plurality of measured locations.

3. An apparatus for performing seismic surveys, said apparatus comprising:
   a land vibrator for imparting induced seismic waves into the earth;
   a non-contact vibrometer for measuring said induced seismic waves;
   a support member for supporting said non-contact vibrometer; and a vibration isolator interposed between said non-contact vibrometer and said support member, said vibration isolator operable to substantially vibrationally isolate said non-contact vibrometer from said land vibrator.

4. An apparatus according to claim 3, further comprising a carrier vehicle for providing locomotion of said land vibrator, wherein said support member is coupled to said carrier vehicle.

5. An apparatus as claimed in claim 3, further comprising a carrier vehicle for providing locomotion of said land vibrator, wherein said support member is located remotely from said carrier vehicle.

6. An apparatus for performing seismic surveys, said apparatus comprising:
- a land vibrator for imparting induced seismic waves into the earth;
- a non-contact vibrometer for measuring said induced seismic waves; and
- an accelerometer coupled to said non-contact vibrometer, said accelerometer generating a vibrometer motion signal indicating the actual motion of said non-contact vibrometer.

7. An apparatus according to claim 6, further comprising a signal filtering device for filtering said vibrometer motion signal from an actual measured signal generated by said non-contact vibrometer, thereby providing a corrected measured signal indicating said induced seismic waves.

8. An apparatus for performing seismic surveys, said apparatus comprising:
- a land vibrator having a baseplate for contacting the earth, said land vibrator operable to induce seismic waves into the earth via said baseplate;
- a laser vibrometer operable to measure the motion of said baseplate and generate a baseplate motion signal indicating the motion of said baseplate;
- a geophone for sensing reflected seismic waves and generating a seismic reflection signal indicating the reflected seismic waves; and
- a computing device communicatively connected to said laser vibrometer and said geophone, said computing device being programmed for recording said baseplate motion signal and said seismic reflection signal.

9. An apparatus according to claim 8, wherein said computing device is further programmed for pulse compressing said seismic reflection signal using said baseplate motion signal.

10. An apparatus according to claim 8, wherein said computing device is further programmed for determining an inverse filter responsive to said baseplate motion signal, said inverse filter having a pass-band that includes harmonics associated with said baseplate.

11. An apparatus according to claim 10, wherein said computing device is further programmed for passing said seismic reflection signal through said inverse filter to yield a pulse-compressed seismic signal which includes harmonic energy injected into the earth by said baseplate.

12. A method for conducting a seismic survey, said method comprising the steps of:
(a) vibrating a baseplate coupled to the earth to thereby impart induced seismic waves in the earth; and
(b) measuring said induced seismic waves with a non-contact vibrometer,
step (b) including directing a laser beam emitted by said non-contact vibrometer to a measured location on an exposed surface of said baseplate.

13. A method for conducting a seismic survey, said method comprising the steps of:
(a) vibrating a baseplate coupled to the earth to thereby impart induced seismic waves in the earth;
(b) measuring said induced seismic waves with a non-contact vibrometer;
(c) pulse-compressing a reflected seismic signal using an induced seismic signal indicating said induced seismic waves measured by said non-contact vibrometer; and
(d) measuring the motion of said non-contact vibrometer to produce a vibrometer motion signal.

14. A method according to claim 13, further comprising:
(e) filtering said vibrometer motion signal from an actual measured signal generated by said non-contact vibrometer to thereby obtain a corrected measured signal indicating said induced seismic waves.

* * * * *